US008874342B2

(12) United States Patent
Noda

(10) Patent No.: US 8,874,342 B2
(45) Date of Patent: Oct. 28, 2014

(54) APPARATUS, PROGRAM AND METHOD FOR COLLISION AVOIDANCE SUPPORT

(75) Inventor: Kazuhiro Noda, Nagoya (JP)

(73) Assignee: Denso Corporation, Kariya (JP)

( * ) Notice: Subject to any disclaimer, the term of this patent is extended or adjusted under 35 U.S.C. 154(b) by 354 days.

(21) Appl. No.: 12/925,636

(22) Filed: Oct. 26, 2010

(65) Prior Publication Data

US 2011/0130936 A1 Jun. 2, 2011

(30) Foreign Application Priority Data

Nov. 30, 2009 (JP) ................................ 2009-272123

(51) Int. Cl.
*G05D 1/02* (2006.01)
*G08G 1/16* (2006.01)

(52) U.S. Cl.
CPC .................................... *C08G 1/163* (2013.01); *G08G 1/167* (2013.01)
USPC .............. 701/70; 701/300; 701/301; 340/438

(58) Field of Classification Search
CPC ............................... G08G 1/163; G08G 1/167
See application file for complete search history.

(56) References Cited

U.S. PATENT DOCUMENTS

| | | | | |
|---|---|---|---|---|
| 5,521,579 | A * | 5/1996 | Bernhard | 340/438 |
| 6,862,537 | B2 * | 3/2005 | Skrbina et al. | 702/32 |
| 8,219,298 | B2 * | 7/2012 | Nishira et al. | 701/96 |
| 8,700,305 | B2 * | 4/2014 | Hayakawa et al. | 701/301 |
| 2009/0088925 | A1 | 4/2009 | Sugawara et al. | |

FOREIGN PATENT DOCUMENTS

| | | |
|---|---|---|
| JP | 8110224 | 4/1996 |
| JP | 10338057 | 12/1998 |
| JP | 2002-307976 | 10/2002 |
| JP | B2-3872033 | 1/2007 |
| JP | 2007042039 | 2/2007 |
| JP | 2007-241439 | 9/2007 |
| JP | 2008040736 | 2/2008 |
| JP | 2009-78735 | 4/2009 |

OTHER PUBLICATIONS

Office Action mailed Sep. 13, 2011 in corresponding Japanese Patent Application No. 2009-272123 (with English translation).

* cited by examiner

*Primary Examiner* — Redhwan k Mawari
*Assistant Examiner* — Edward Torchinsky
(74) *Attorney, Agent, or Firm* — Harness, Dickey & Pierce, PLC

(57) ABSTRACT

A collision avoidance support apparatus sets a side area right beside an own vehicle in an adjacent lane as a constant-speed target space, which is used for lane change at a constant speed, and also sets a diagonally-front area and a diagonally-rear area as alt-speed target spaces, which are used for lane change at an accelerated speed and at a decelerated speed. Then, a target space that is free of other vehicles is extracted by the apparatus. If there is no target space that is free of the other vehicles, the lane change is determined as unsafe. If there is no other vehicle in the constant-speed target space, the lane change is determined to be safe at the constant speed. If there is no other vehicle in at least one of the alt-speed target spaces, the lane change is determined to be safe at an accelerated speed or a decelerated speed.

20 Claims, 6 Drawing Sheets

APPARATUS, PROGRAM AND METHOD FOR COLLISION AVOIDANCE SUPPORT

CROSS REFERENCE TO RELATED APPLICATION

The present application is based on and claims the benefit of priority of Japanese Patent Application No. 2009-272123, filed on Nov. 30, 2009, the disclosure of which is incorporated herein by reference.

FIELD OF THE INVENTION

The present invention generally relates to a collision avoidance support apparatus which provides support for avoiding collision with other vehicles when an own vehicle moves from one lane to an adjacent lane in traffic, and a collision avoidance support program as well as a method of supporting collision avoidance.

BACKGROUND INFORMATION

As a collision avoidance support apparatus, the following apparatus disclosed in Japanese patent document 1 is known, for example, which determines a selling regarding whether or not to provide a warning according to the distance to a nearby vehicle that is traveling in the adjacent lane.

Japanese patent document 1: JP 3,872,033

However, when a warning was provided by the above collision avoidance support apparatus, the driver of the vehicle can understand that lane-changing is not possible right now, but cannot have a clue of how to change lanes safely. That is, the driver has to determine by him/herself how to change lanes safely in traffic. In otherwords, the driver's load for changing lanes after the warning is, not reduced by the above-described collision avoidance support apparatus.

SUMMARY OF THE INVENTION

In view of the above and other problems, the present invention provides a collision avoidance support apparatus that reduces driver's load for changing lanes in the course of providing support for avoiding collision with other vehicles.

In an aspect of the present invention, the collision avoidance support apparatus, which provides lane change support for an own vehicle when the own vehicle moves from a currently-traveling lane to an adjacent lane, includes: a constant-speed targeting unit for setting as a target space a right-beside area of the own vehicle in the adjacent lane for constant-speed lane change of the own vehicle; and an alt-speed targeting unit for setting as a target space at least one diagonally-side area of the own vehicle in the adjacent lane for altered-speed lane change of the own vehicle. The diagonally-side area has a forward extension of the right-beside area when the own vehicle is required to accelerate before moving to the target space in the adjacent lane, and the diagonally-side area has a backward extension of the right-beside area when the own vehicle is required to decelerate before moving to the target space in the adjacent lane; a vehicle detection unit for detecting a position of an other vehicle that is traveling in the adjacent lane. The apparatus further includes: a target extraction unit for extracting, from among target spaces set by each of the targeting units, a target space that is free of the other vehicle based on the detected position of the other vehicle from the vehicle detection unit; and a lane change determination unit for determining whether to perform a lane change. The determination of whether to perform the lane change is one of (a) the lane change of the own vehicle is unsafe when each of the right-beside area and the diagonally-side areas in the adjacent lane is occupied by at least one other vehicle, (b) the lane change of the own vehicle to the right-beside area is safe at a current-speed when the right-beside area in the adjacent lane is not occupied by the other vehicle, and (c) the lane change of the own vehicle to the diagonally-side area is safe after acceleration or deceleration when the diagonally-side area with the forward extension or with the backward extension in the adjacent lane is not occupied by the other vehicle.

The collision avoidance support apparatus of the present invention sets multiple target spaces at different positions in front of and in rear of the own vehicle in the adjacent lane, and then determines that the lane change is possible without changing the current vehicle speed, or with acceleration or deceleration from the current vehicle speed, depending on whether or not the respective target spaces are occupied by the other vehicle.

Therefore, according to such a collision avoidance support apparatus, it is determined that the lane change of the own vehicle is safely performed by acceleration/deceleration even when the lane change at the current vehicle speed is not possible. Thus, the collision avoidance support apparatus determines and advises the driver how to change lanes safely, thereby reducing the driver's load of changing lanes.

Further, in another aspect of the present invention, a method of avoiding collision of an own vehicle that is moving from a currently-traveling lane to an adjacent lane in traffic, includes: detecting a position of an other vehicle in the adjacent lane; detecting a travel speed of the own vehicle; calculating a relative speed of the other vehicle; defining a lane change target space in the adjacent lane, the target space defined as at at least one of a side position, a diagonally-front position, and a diagonally-rear position of the own vehicle; determining lane-changeability based on the defined lane change target space and the detected position of the other vehicle; and providing a lane change instruction that instructs either (a) to move to the adjacent lane when the determined lane-changeability is positive, or (b) to stay in the currently-traveling lane when the determined lane-changeability is not positive.

In this manner, the above-described method sets multiple target spaces at different positions in front of and in rear of the own vehicle in the adjacent lane, and then determines that the lane change is possible without changing the current vehicle speed, or with acceleration or deceleration of the current vehicle speed, depending on whether or not the respective target spaces are occupied by the other vehicle. Then, lane-changeability is notified as an instruction for the driver of the own vehicle.

Therefore, according to such a method, it is determined that the lane change of the own vehicle is safely possible by acceleration/deceleration even when the lane change at the current vehicle speed is not possible. Thus, the driver of the own vehicle is properly supported in terms of how to change lanes safely, thereby effectively reducing the driver's operation load of changing traffic lanes.

The diagonally-side area (i.e., the forward/backward extension of the right-beside area) and the right-beside area itself set as target spaces in the collision avoidance support apparatus of the present invention are substantially same as the diagonally-front/rear position and the side position set as target spaces in the method of avoiding collision in the present invention. Further, the collision avoidance support apparatus is described to be used in the right-side traffic environment in Japan, United Kingdom or the like in the following embodiment, the apparatus may also be used in the left-side traffic environment in other countries without problem when the right-and-left relationship in the description is flipped over.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
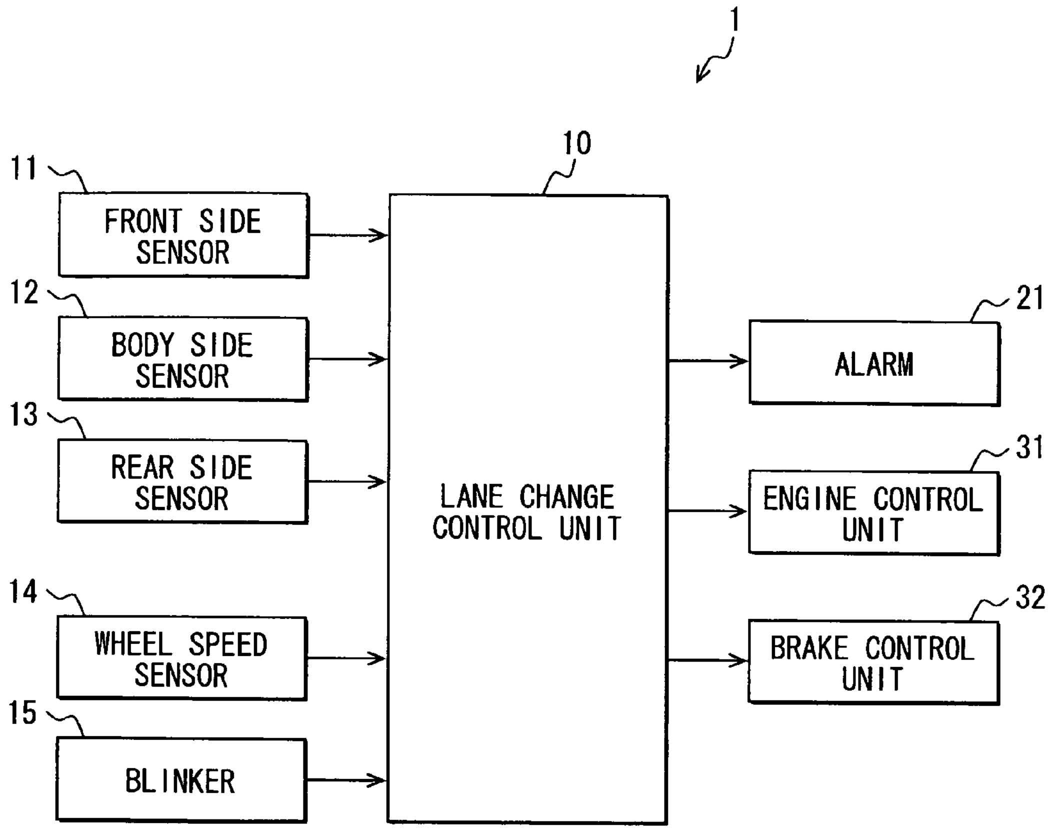
FIG. 1 is a block diagram of a configuration of a collision avoidance support system in an embodiment of the present invention.

An embodiment of the present invention is explained in the following with reference to the drawing.

FIG. 1 is a block configuration diagram of a collision avoidance support system 1 in an embodiment of the present invention.

The collision avoidance support system 1 according to the present invention is installed in, for example, a passenger vehicle or the like (designated as an "own vehicle" hereinafter), and the collision avoidance support system 1 provides a support for avoiding a collision of the own vehicle when the own vehicle moves to a next traffic lane that extends adjacent to a currently-traveling lane of the own vehicle (designated as an "adjacent lane" hereinafter).

In the present embodiment, a process of the own vehicle to move to the adjacent lane on the right side is explained. However, the same process can be used to change to the adjacent lane on the left side with the same hardware configuration, for achieving the same advantages. Further, the same process can be used to change to both of the right and left adjacent lanes as well.

The collision avoidance support system 1 includes a lane change control unit 10 (a collision avoidance support apparatus) and side sensors 11 to 13, a wheel speed sensor 14, a blinker 15, an alarm 21, an engine control unit 31, and a brake control unit 32, as shown in FIG. 1. In addition, the side sensors 11 to 13 are implemented as a front side sensor 11, a body side sensor 12, and a rear side sensor 13.

Side sensors 11 to 13 transmit electromagnetic waves such as electric waves respectively toward a sensor-specific predetermined area in the adjacent lane on the right side of the own vehicle, and detect a relative position, as well as a relative speed, of the other vehicle in the right adjacent lane relative to the own vehicle based on a reflection of the transmitted electric wave.

The body side sensor 12 transmits, in particular, the electromagnetic wave toward an area just beside the own vehicle, for detecting the other vehicle in this "just-beside" area. The area "just" beside the own vehicle is substantially identical to the "right-beside" area in claim language.

In addition, the front side sensor 11 transmits an electromagnetic wave toward an area more forward than the area to which the body side sensor 12 transmits an electromagnetic wave, for detecting the other vehicle in this forward area. In this case, the object detection area of the front side sensor 11 and the object detection area of the body side sensor 12 are configured to be partially overlapping with each other.

Furthermore, the rear side sensor 13 transmits an electromagnetic wave toward an area more backward than the area to which the body side sensor 12 transmits an electromagnetic wave, for detecting the other vehicle in this backward area. In this case, the object detection area of the rear side sensor 13 and the object detection area of the body side sensor 11 are configured to be partially overlapping with each other.

The forward area and the backward area described above correspond to the diagonally-side area (forward/backward extension of the right-beside area) as well as the diagonally-front position and diagonally-rear position in claim language. Further, the above naming of the target spaces in front and rear of the own vehicle in claims is intended to describe a situation that a target space seen from the own vehicle is at a diagonally front/rear position of the own vehicle. Further, the above naming of the forward and backward extension of the right-beside area in claims is intended to describe a situation that the right-beside area is extended and/or slid forward and backward to define a suitable target space in the adjacent lane. Further, the right-beside area and the side position in claims are used to un-ambiguously and correctly describe a situation that the target space in the constant-speed lane change is set as an area squarely beside the own vehicle in the adjacent lane. The right-beside area and the target space at the side position are used in claims to indicate an area in the adjacent lane that at least accommodates one vehicle.

The wheel speed sensor 14 is a well-known sensor detecting rotation speed of the wheels in the own vehicle. In addition, the blinker 15 is implemented as a well-known turn signal indicator.

The detection result of the side sensors 11 to 13 as well as detection result of the wheel speed sensor 14 and information on working conditions of the blinker 15 are configured to be acquired by the lane change control unit 10. The lane change control unit 10 consists mainly of a well-known microcomputer which possesses a CPU, a ROM, a RAM, and the like, and executes a process based on a program stored in the ROM and RAM (e.g., a collision avoidance support program, and the like).

In addition, the lane change control unit 10 is also connected to the engine control unit 31 that controls engine operation, and the brake control unit 32 that controls brake operation. The lane change control unit 10 sends, as a pre-crush system, a stop instruction to stop the engine operation to the engine control unit 31, or sends other instruction to operate the brake to the brake control unit 32 when a possibility of collision of the own vehicle to the other vehicle exceeds a certain threshold. In addition, the lane change control unit 10 instructs the alarm 21 to perform a warning (i.e., a notification) depending on a processing result.

The alarm 21 can perform various kinds of alarm in respectively distinguishable manners. That is, if the alarm 21 is implemented as a speaker, various types of alarm sounds and voices are output for different alarm contents, and, if the alarm 21 is implemented as a display device, various messages are displayed and/or various marks are lighted/flashed for representing different notification contents.

In the collision avoidance support system 1, the following processes are performed.

Figure 2A:
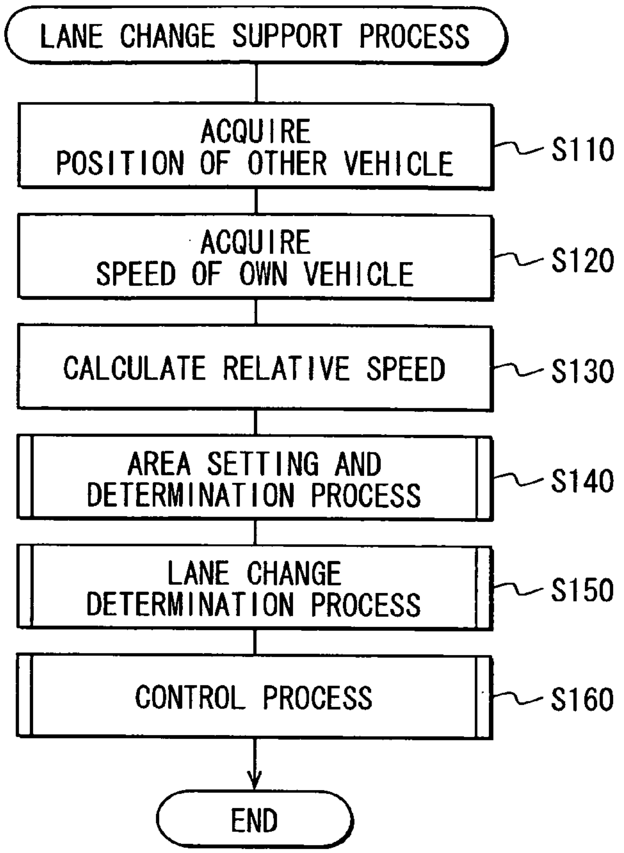
FIGS. 2A and 2B are flowcharts of a lane change support process and an area setting and determination process in the embodiment.
Figure 2B:
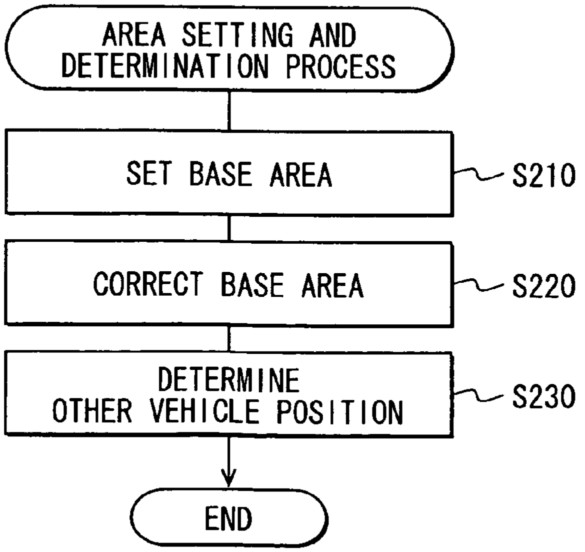
Figure 3:
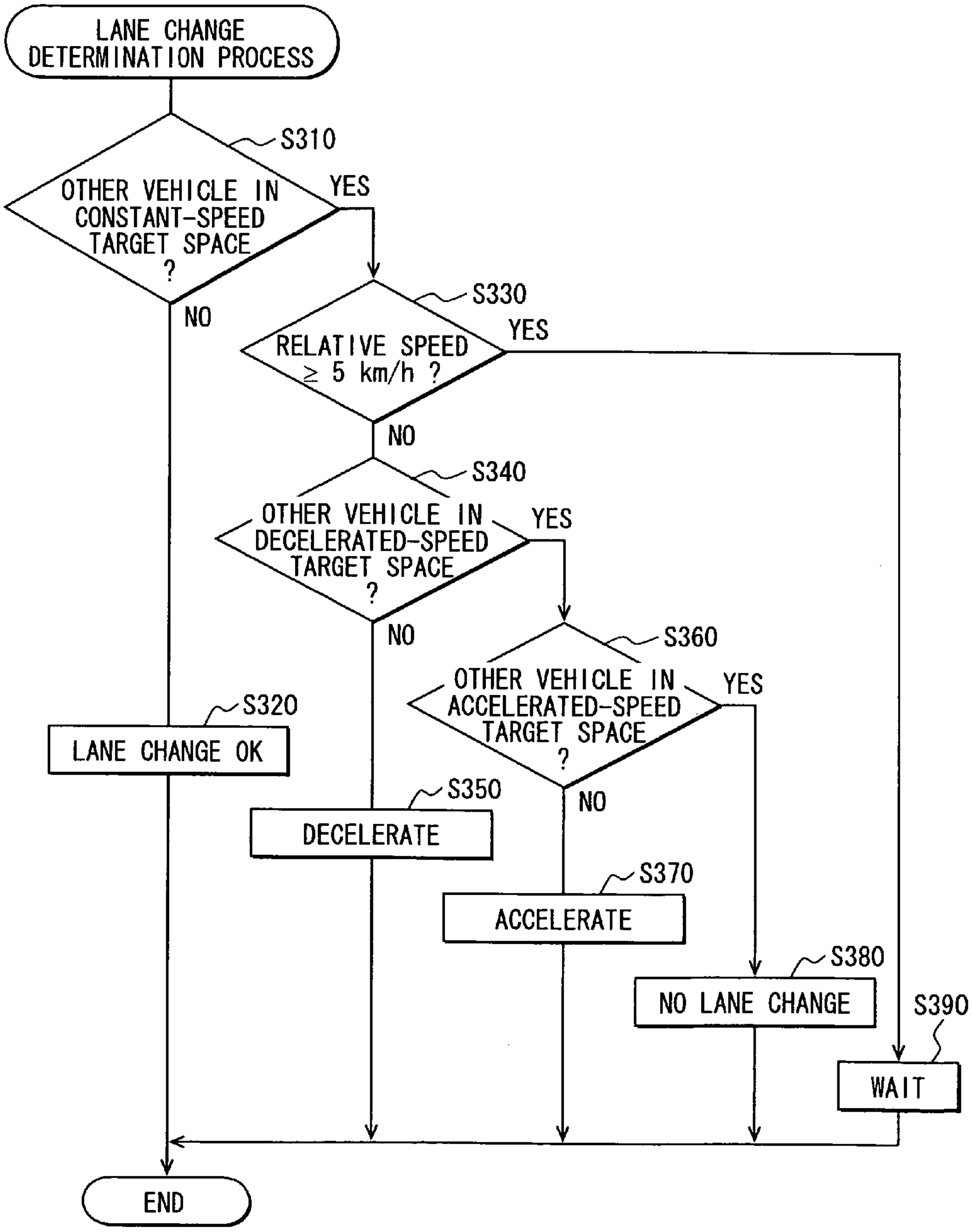
FIG. 3 is a flowchart of a lane change determination process in the embodiment.
Figure 4:
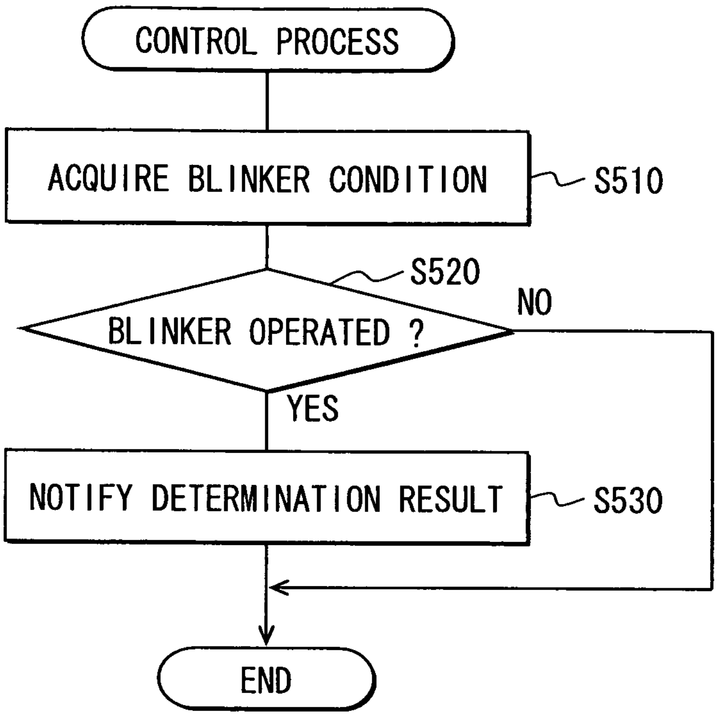
FIG. 4 is a flowchart of a control process in the embodiment.

FIGS. 2A and 2B are flowcharts of a lane change support process and an area setting and determination process in the lane change support process in the embodiment. FIG. 3 is a flowchart of a lane change determination process in the lane change support process in the embodiment. FIG. 4 is a flowchart of a control process in the lane change support process in the embodiment.

The lane change support process is a process that is repeated at certain intervals (e.g., at every 100 ms) after the start of the process by the power supply of the own vehicle due to the turning of an ignition switch (not illustrated) or a similar operation. In the lane change support process, the position of the other vehicle in the adjacent lane is acquired from each of the side sensors 11 to 13 (S110: corresponding to a vehicle detection unit in claim language).

Then, information on a travel speed (i.e., a vehicle speed) of the own vehicle is acquired from the wheel speed sensor 14 (S120: corresponding to a speed acquisition unit in claim language), and detection results of the relative speed of the other vehicle existing in the adjacent lane relative to the own vehicle are acquired from each of the side sensors 11 to 13 (S130: corresponding to a relative speed acquisition unit in claim language).

Then, the area setting and determination process (S140), the lane change determination process (S150: corresponding to a lane change determination unit in claim language), and the control process (S160) are executed sequentially, and the lane change support process is concluded when all of these sub-processes are concluded.

The area setting and determination process (S140) is a process that sets (i.e., reserves) a side area including an area just beside the own vehicle in the adjacent lane on the right side as a target space of constant-speed lane change required for the lane change of the own vehicle at a constant speed, as well as (a) setting a diagonally-front area including a forward area relative to the side area of the own vehicle in the adjacent lane as a target space of alt-speed lane change, i.e., an accelerated-speed lane change in this case, required for the lane change of the own vehicle at an accelerated speed, and (b) setting a diagonally-rear area including a backward area relative to the side area of the own vehicle in the adjacent lane as a target space of alt-speed lane change, i.e., a decelerated-speed lane change in this case, required for the lane change of the own vehicle at a decelerated speed.

In the course of setting the target space, for each of the target space of the constant-speed lane change, the target space of the accelerated-speed lane change and the target space of the decelerated-speed lane change, a base area is set as shown in FIG. 2B (S210: corresponding to a constant-speed targeting unit and an alt-speed targeting unit in claim language). The base area is set based on information on the travel speed of the own vehicle. The target space of the three types of lane change described above may be designated as "each space" in the following description.

The base area of the constant-speed lane change is set in the adjacent lane in the following manner (in the right lane in the present embodiment). That is, the base area has a front margin in front of a reference position and a rear margin on the back of the reference position, each of the front/rear margins set as a distance of one-second travel of the own vehicle, for example, and the reference position is set right beside a front end of the own vehicle in the right lane. In other words, the base area is defined as an area between (a) a front edge that is set at a one-second travel distance of the own vehicle in front of the reference position and (b) a rear edge that is set at a one-second travel distance on the back of the reference position.

The base area of the accelerated-speed lane change is set as an area that includes a forward area of the constant-speed base area described above, from a rear edge of the base area set at 2 meters backward from a reference position in the adjacent lane. The reference position is set right beside the front end of the own vehicle. That is, the base area of the accelerated-speed lane change is defined as an area between (a) a front edge that is set at a two-second travel distance of the own vehicle relative to the reference position at the front end of the own vehicle and (b) a rear edge that is set at 2 meters backward from the front end of the own vehicle.

The base area of the decelerated-speed lane change is set as an area that includes a backward area of the constant-speed base area described above, from a front edge of the base area set at 2 meters forward from a rear end of the own vehicle in the adjacent lane. That is, the base area of the decelerated-speed lane change is defined as an area between (a) a front edge that is set at 2 meters forward from the rear end of the own vehicle and (b) the rear edge that is set at a two-second travel distance of the own vehicle relative to a reference position at the rear end of the own vehicle.

The size of each target space is corrected according to the relative speed (S220: corresponding to a correction unit in claim language). In other words, the size of the base area in each space is changed.

The correction of the each target space is performed as a position change of the front edge and/or the rear edge of the base area, based on a calculation of change of the distance between the own vehicle and the other vehicle during a predetermined time of 2 seconds, for example, by using the relative speed. In case that multiple vehicles are detected, the corrected front and rear edges of the base area are calculated for each of the multiple vehicles based on the relative speed in the first place, and the base area is defined as an area between the most forward edge and the most backward edge from among The corrected edges. In other words, the largest area size of the corrected base area is preferably set as the target space.

In the base area correction process, the front and rear edges of each of the base areas are shifted backward according to the relative speed if the speed of the other vehicle is greater than the own vehicle, or the front and rear edges of each of the base areas are shifted forward if the speed of the other vehicle is smaller than the own vehicle according to the relative speed.

Further, in the base area correction process, the correction is not performed for the target space of the lane change that apparently does not have the other vehicle. That is, the correction process is not performed for the target space of the accelerated-speed lane change if the other vehicle exists only on the backward side of the accelerated-speed lane change target space, or the target space of the decelerated-speed lane change if the other vehicle exists only on the forward side of the decelerated-speed lane change target space. Furthermore, the correction process is not performed for the rear edge of the accelerated-speed lane change and the front edge of the decelerated-speed lane change. Furthermore, each of the front edge and the rear edge of the target space is configured not to be within 10 meters from the reference position after the correction process, which is set at the front end of the own vehicle.

Here, the example of setting a base area and its correction process is explained with reference to FIGS. 5A, 5B, 6A and 6B.

Figure 5A:
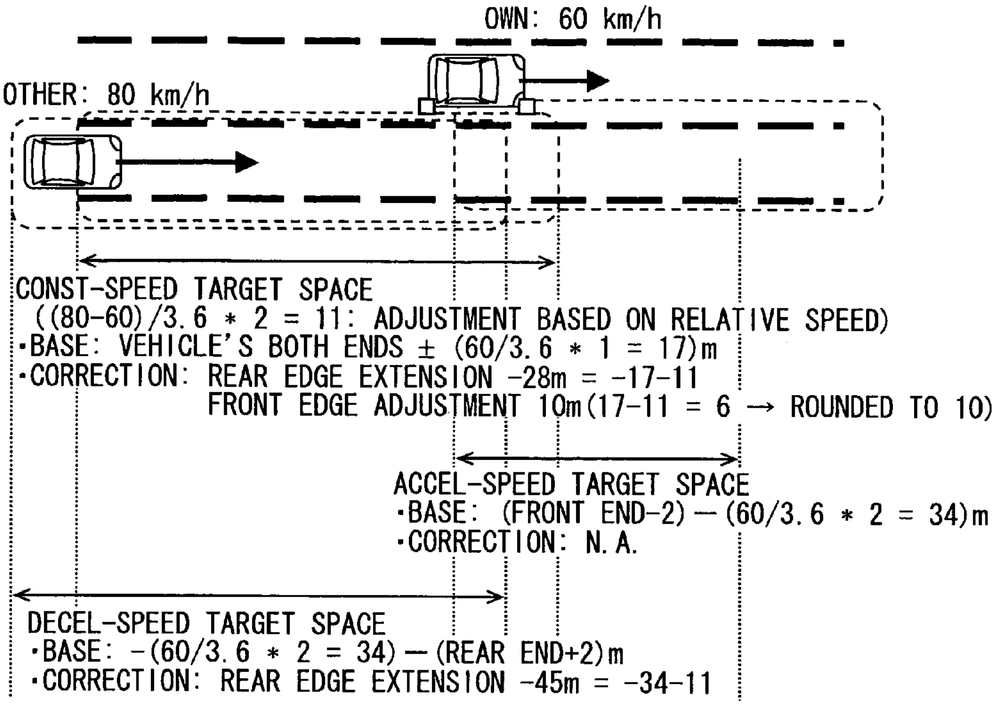
FIGS. 5A and 5B are illustrations of target space setting in an other vehicle catch-up situation and target space setting in an other vehicle passing situation in the embodiment.
Figure 5B:
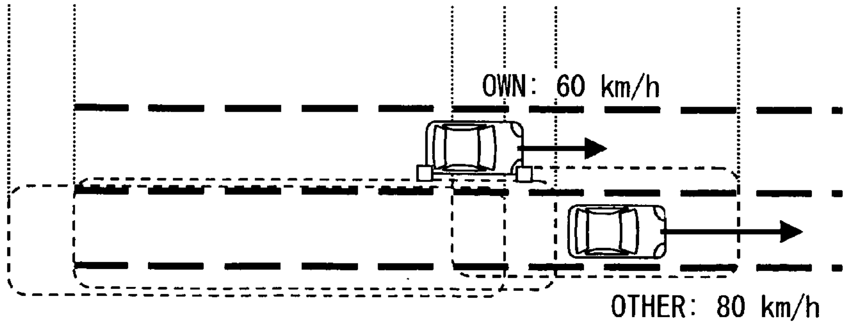
Figure 6A:
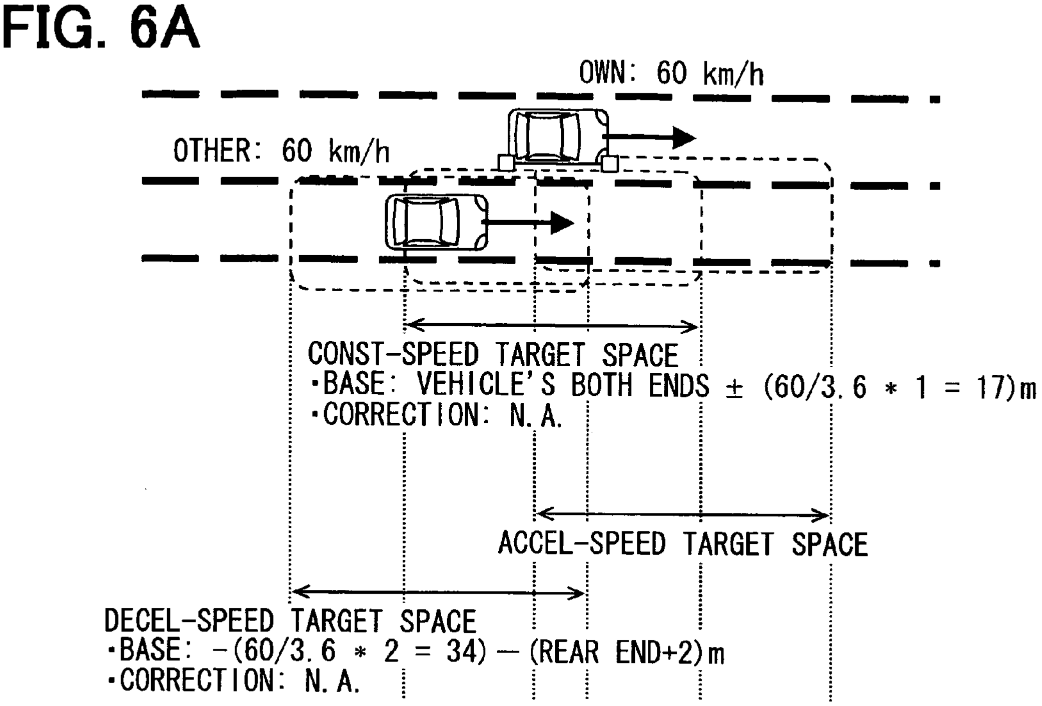
FIGS. 6A and 6B are illustrations of target area setting in keep-pace situations with one or more other vehicles in the embodiment.
Figure 6B:
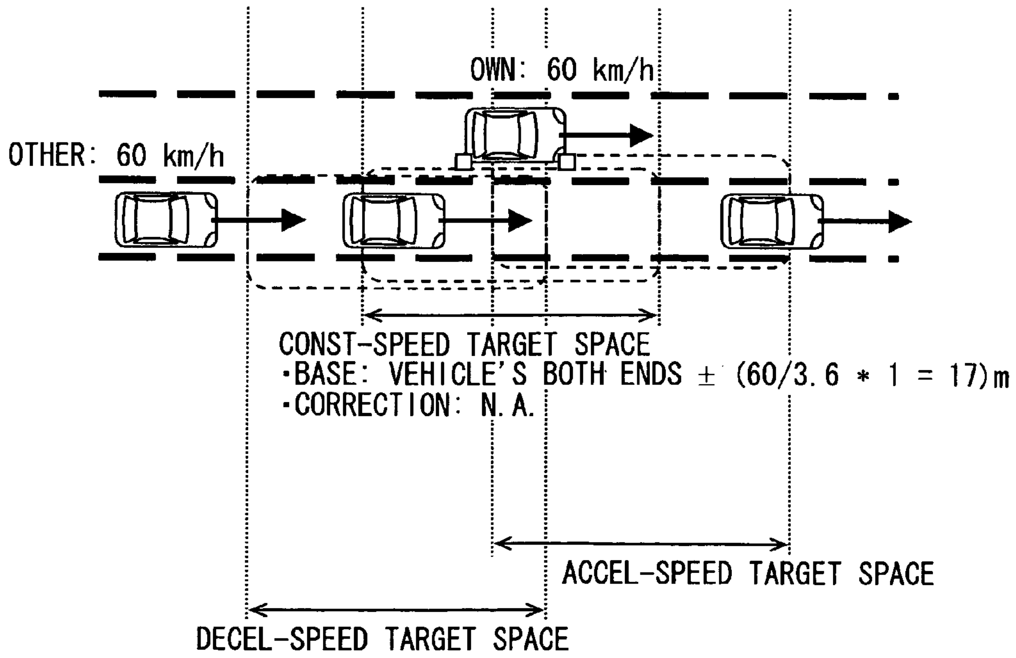

FIGS. 5A and 5B are illustrations of target space setting in an other vehicle catch-up situation where the other vehicle is approaching to the own vehicle and in an other vehicle passing situation where the other vehicle is passing and going away from the own vehicle. FIGS. 6A and 6B are illustrations of target area setting in a keep-pace situation where one or more vehicles travel with the own vehicle at substantially the same speed.

In the example shown in FIG. 5A, the own vehicle travels at 60 km/h, and the other vehicle comes closer to the own vehicle at 80 km/h from the back of the own vehicle. Because the speed of the own vehicle is 60 km/h in the present case, the travel distance of the own vehicle in one second is about 17 m. Therefore, the base area of the constant-speed lane change target space is set as an area between (a) the front edge set at 17 m forward from the reference position that is just beside the front end of the own vehicle, and (b) the rear edge set at 17 m backward from the same reference position.

In addition, the travel distance of the own vehicle in two seconds is about 34 m, because the speed of the own vehicle is 60 km/h. The base area of the accelerated-speed lane change target space is set as an area between (a) the front edge set at 34 m forward from the reference position that is just beside the front end of the own vehicle, and (b) the rear edge set at 2 m backward from the same reference position. Likewise, the base area of the decelerated-speed lane change target space is set as an area between (a) the front edge set at 2 m forward from the reference position that is just beside the rear end of the own vehicle, and (b) the rear edge set at 34 m backward from the same reference position.

These base areas are corrected according to the relative speed between the own vehicle and the other vehicle. In the example shown in FIG. 5A, the relative speed is 20 km/h that reduces an inter-vehicle distance between the own vehicle and the other vehicle. Therefore, two second travel distance of the own vehicle is about 11 m. Thus, both of the front edge and the rear edge of the base area of the constant-speed lane change target space are moved backward by 11 m. In this case, in calculation, the front edge of the corrected base area is positioned at 6 m (=17−11) forward from the reference position that is just beside the front end of the own vehicle. However, the front edge is set at 10 m forward from the reference position, because 10 m is configured as a minimum of the front edge from the reference position (by overriding the above-calculated value of 6 m). The rear edge of the base area is set at 28 m (=11+17) backward from the front end of the own vehicle.

Further, the front edge of the decelerated-speed lane change target space is not corrected in the correction process, and the rear edge is moved backward by 11 m, in the same manner as the rear edge of the constant-speed lane change target space, to be set at 45 m (=34+11) backward from the reference position that is set at 2 m forward from the rear end of the own vehicle. In this case, the accelerated-speed lane change target space is not corrected, because the other vehicle is positioned only on the back side of the own vehicle.

When the other vehicle overtook the own vehicle with the above speeds of both vehicles kept unchanged, the situation looks like an illustration in FIG. 5B. That is, the base area of each target space is set in the same manner as FIG. 5A due to no speed change of the own vehicle at 60 km/h. The constant-speed lane change target space is also set in the same manner as shown in FIG. 5A after the correction process, because the relative speed is not changed.

The accelerated-speed lane change target space is corrected, because the position of the other vehicle has changed from the back of the own vehicle to the front of the own vehicle. That is, the front edge of the target space is set at 23 m from the reference position, 11 m behind 34 m position of the base area.

The decelerated-speed lane change target space is not corrected, because the position of the other vehicle has changed from the back of the own vehicle to the front of the own vehicle.

When the own vehicle travels at the same speed with one or more other vehicles as shown in FIGS. 6A and 6B, the base area of each target space is set in the same manner as shown in FIGS. 5A and 5B, and no correction process is performed.

After setting the each target space in S210, S220, the position of the other vehicle in the adjacent lane is determined (S230: corresponding to a target extraction unit in claim language). In this process, “occupied” and “un-occupied” target spates are respectively extracted from among all target spaces set in the above-described manner, based on the detection results of the other vehicles by the side sensors 11 to 13. The term “occupied” in this case means that the target space has one or more other vehicles, and the term “un-occupied” means that the target space has no vehicle at all. After this extraction process, the area setting and determination process is concluded.

The lane change determination process (S150) is explained in the following with reference to the flowchart in FIG. 3. The lane change determination process determines that (a) if there is no “un-occupied” target space, lane change is unsafe, (b) if the constant-speed lane change target space is “un-occupied,” lane change is possible at the current travel speed, or (c) at least one of the accelerated-speed lane change target space or the decelerated-speed lane change target space is “un-occupied,” lane change is possible after acceleration/deceleration.

More practically, this process determines whether there is the other vehicle in the constant-speed lane change target space set by the area setting and determination process (S310). If there is no other vehicle in the target space (5310: NO), it is determined that lane change is possible at the current travel speed of the own vehicle (S320), and the lane change determination process is concluded. If there is the other vehicle in the target space (S310:YES), the relative speed of the other vehicle against the own vehicle in the constant-speed lane change target space is compared with a predetermined value of 5 km/h (i.e., whether the other vehicle is coming closer to the own vehicle at the relative speed of 5 km/h or more is determined), for example (S330). The relative speed being equal to or exceeding the predetermined value (S330:YES) leads to the determination that (a) it is unsafe to change lanes until the other vehicle passes by the own vehicle, and (b) it is recommended to wait for the passing of the other vehicle (S390). In this case, the user is notified that lane change will be possible after waiting (i.e., staying) for a few seconds.

The relative speed being smaller than the predetermined value (S330:NO) leads to the determination whether there is the other vehicle in the decelerated-speed lane change target space (S340). If there is no other vehicle in that target space (S340:NO), it is determined that lane change is possible after deceleration even when there is the other vehicle in the constant-speed lane change target space, and the user is prompted to decelerate the own vehicle (S350). Then, the lane change determination process is concluded.

Further; if there is the other vehicle in that target space (S340:YES), it is then determined whether there is the other vehicle in the accelerated-speed lane change target space (S360). If there is no other vehicle in the accelerated-speed lane change target space (S360:NO), it is determined that it is possible to change lanes after acceleration, and the user is prompted to accelerate the own vehicle (S370). Then, the lane change determination process is concluded.

If there is at least one other vehicle in the accelerated-speed lane change target space (S360:YES), it is determined that it is impossible to change lanes for the time being (S380), and the lane change determination process is concluded. The determination results of the lane change determination process are recorded in memory, such as the RAM of the lane change control unit 10 or the like.

The control process (S160) is explained in the following with reference to the flowchart in FIG. 4. The control process considers a determination result of the lane change determination process, and performs a notification and the like for the driver of the own vehicle. More practically, the control process acquires an operation condition of the blinker 15 as a detection result of the operation of the vehicle driver of the own vehicle, as shown in FIG. 4 (S510: corresponding to an operation result acquisition unit in claim language). Then, the process determines whether the blinker 15 is operated (S520: corresponding to a prohibition unit in claim language).

In this control process, because it is assumed that the own vehicle is going to change lanes to the right adjacent lane, the process acquires in S510 the operation condition of the right side blinker 15. If the system 1 is configured to avoid collision in the lane change process to the left lane, this control process acquires the operation condition of the left side blinker 15. When the system 1 is configured to avoid collision in the lane change process to the right and left lanes, this control process acquires the operation condition of the right and left side blinkers 15, and determines which of the two blinkers 15 is operated in the next step.

If it is determined that the blinker 15 is being operated (S520:YES), a determination result by the lane change determination process is retrieved from memory such as the RAM, and the alarm 21 is controlled to notify the retrieved contents of the determination result (S530: corresponding to a notification unit in claim language). Then, the control process is concluded. If it is determined that the blinker 15 is not being operated (S520:NO), the control process is concluded without performing any other step.

The alarm 21 for notifying the determination result uses different messages and sounds for respectively different determination contents, for the purpose of distinguishably notifying the driver of the required lane change operation.

In addition, just like the alarm 21, the engine control unit 31 and the brake control unit 32 may be employed to automatically accelerate/decelerate the own vehicle based on the determination result of the lane change determination process, when the blinker 15 is being operated. More practically, when the blinker 15 is being operated and the deceleration is advised by the lane change determination process, the brake control unit 32 may be controlled to automatically decelerate the own vehicle to realize a condition that allows the lane change of the own vehicle. Alternatively, when the blinker 15 is being operated and the acceleration is advised by the lane change determination process, the engine control unit 31 may be controlled to automatically accelerate the own vehicle to realize a condition that allows the lane change of the own vehicle.

In summary, the collision avoidance support system 1 of the present invention operates in the following manner, and achieves the following advantageous effects. That is, in the lane change support process, the lane change control unit 10 sets three areas in the adjacent lane (i.e. three target spaces) either as the constant-speed lane change target space, the accelerated-speed lane change target space, and the decelerated-speed lane change target space, respectively for the lane change of the own vehicle at a constant speed, at an accelerated speed (i.e., after acceleration), or at a decelerated speed (i.e., after deceleration). The constant-speed lane change target space is right beside the own vehicle in the adjacent lane, and the accelerated-speed lane change target space is forward extended relative to the constant-speed lane change target space, and the decelerated-speed lane change target space is backward extended relative to the constant-speed lane change target space. Then, the position of the other vehicle is detected, for the extraction of the "un-occupied" target space from among those (e.g., three) target spaces. If no "un-occupied" target space is found, it is determined that lane change is unsafe, and if an "un-occupied" target space is found, it is determined that the lane change is possible either at the constant (i.e., current) speed, or after acceleration/deceleration.

In other words, the collision avoidance support system 1 can advise the driver of the own vehicle to change lanes at the current speed, or after acceleration/deceleration, depending on the detected position of the other vehicle in the three target spaces.

Therefore, according to such collision avoidance support system 1, the driver's load for lane change determination is advantageously reduced, because, under the advice from the system 1 to the driver to accelerate/decelerate for lane change, the driver can safely move to the adjacent lane even when it is impossible to move to the right-beside position of the adjacent lane at the current speed.

In addition, the lane change control unit 10 in the collision avoidance support system 1 acquires information on the travel speed of the own vehicle, and sets the size of the three target spaces based on the information on the travel speed of the own vehicle. In particular, the collision avoidance time of one second or the like for allowing the own vehicle and the other vehicle to avoid collision is used to define and set the size of each of the target spaces.

According to such collision avoidance support system 1, an appropriate size is reserved as the lane change target space based on the travel speed of the own vehicle.

In addition, the lane change control unit 10 in the collision avoidance support system 1 acquires the detection result of the relative speed of the own vehicle relative to the other vehicle in the adjacent lane, and the size of the target space is corrected according to the acquired relative speed. In particular, the correction of the target space is performed by adjusting the edge position of the target space on the other vehicle side, relative to the reference position right beside the own vehicle, according to the relative speed.

Therefore, the size of each of the target spaces is "adjusted" according to the relative speed of the vehicle in the determination process, thereby enabling the collision avoidance support system 1 to have a more practical and feasible lane change determination.

Furthermore, the lane change control unit 10 in the collision avoidance support system 1 determines that the overtaking other vehicle should be allowed to pass the own vehicle when (a) the other vehicle is detected in one of the target spaces with the relative speed exceeding a threshold, and (b) there still is an "un-occupied" target space.

According to such configuration of the collision avoidance support system 1, a fine-tuned lane change determination is provided when the other vehicle is coming closer to the own vehicle.

Furthermore, the lane change control unit 10 in the collision avoidance support system 1 notifies the driver of the own vehicle about the determination result of the lane change determination process (S150).

Therefore, the driver of the own vehicle is appropriately notified by the collision avoidance support system 1 about the acceleration/deceleration for a safe lane change.

Furthermore, the lane change control unit 10 in the collision avoidance support system 1 acquires the detection result of the driver's operation in the lane change process, and prohibits the notification of the determination result of the lane change determination process (S150) if the driver's operation is not detected.

In this manner, the notification of the determination result is performed only when it is required; thereby preventing user's uncomfortableness by the unnecessary collision avoidance notification.

Although the present disclosure has been fully described in connection with preferred embodiment thereof with reference to the accompanying drawings, it is to be noted that various changes and modification's will become apparent to those skilled in the art.

For example, though the determination result of the lane change determination process (S150) is considered to determine whether to provide notification in the control process (S160), the control process may control the behavior and/or attitude of the own vehicle based on the determination result.

In addition, though the operation condition of the blinker 15 is acquired by the control process, other operation conditions may be acquired for detecting the lane change, as long as the other operation conditions performed by the driver are associated with the lane change of the own vehicle.

Furthermore, though a base area is set for each of the target spaces and the size of some of those base areas are corrected in the area setting and determination process (S140), the size of all of those base areas may be corrected in the area setting and determination process for achieving substantially the same advantages.

Such changes, modifications, and summarized schemes are to be understood as being within the scope of the present disclosure as defined by appended claims.

What is claimed is:

1. A collision avoidance support apparatus for providing lane change support for an own vehicle when the own vehicle moves from a currently-traveling lane to an adjacent lane, the apparatus comprising:

a constant-speed targeting unit for setting as a constant-speed target space a right-beside area of the own vehicle in the adjacent lane for a constant-speed lane change of the own vehicle at a current speed;

an alt-speed targeting unit for setting as (i) an accelerated-speed target space a forward diagonally-side area of the own vehicle in the adjacent lane for an accelerated-speed lane change of the own vehicle, wherein the forward diagonally-side area includes a forward extension of the right-beside area when the own vehicle is required to accelerate before moving to the target space in the adjacent lane, and as (ii) a decelerated-speed target space a backward diagonally-side area of own vehicle in the adjacent lane, wherein the backward diagonally-side area includes a backward extension of the right-beside area when the own vehicle is required to decelerate before moving to the target space in the adjacent lane;

a vehicle detection unit for detecting a position of an other vehicle that is traveling in the adjacent lane;

a target extraction unit for extracting, from among target spaces set by each of the targeting units, a target space that is free of the other vehicle based on the detected position of the other vehicle from the vehicle detection unit;

a lane change determination unit for determining whether to perform a lane change, wherein the determination of whether to perform the lane change is one of (a) the lane change of the own vehicle is unsafe when each of the right-beside area and the diagonally-side areas in the adjacent lane is occupied by at least one other vehicle, (b) the lane change of the own vehicle to the right-beside area is safe at the current speed when the right-beside area in the adjacent lane is not occupied by the other vehicle, and (c) the lane change of the own vehicle to the diagonally-side area is safe after acceleration or deceleration when the diagonally-side area with the forward extension or with the backward extension in the adjacent lane is not occupied by the other vehicle; and a relative speed acquisition unit for acquiring a relative speed of the other vehicle in the adjacent lane relative to the own vehicle, wherein, the lane change determination unit performs the constant-speed lane change of the own vehicle when the other vehicle is not in the constant-speed target space, the lane change determination unit maintains the own vehicle at a current speed such that the constant-speed lane change of the own vehicle is performed after the other vehicle passes the own vehicle when the other vehicle is in the constant-speed target space and the relative speed of approach of the other vehicle is equal to or greater than a threshold speed, the lane change determination unit performs the decelerated-speed lane change of the own vehicle when the other vehicle is in the constant-speed target space, the relative speed of approach of the other vehicle is less than the threshold speed, and the other vehicle is not in the decelerated-speed target space, or the lane change determination unit performs the accelerated-speed lane change of the own vehicle when the other vehicle is in the constant-speed target space, the relative speed of approach of the other vehicle is less than the threshold speed, the other vehicle is in the decelerated-speed target space, and the other vehicle is not in the accelerated-speed target space.

2. The collision avoidance support apparatus of claim 1 further comprising:

a speed acquisition unit for acquiring information on a travel speed of the own vehicle, wherein the constant-speed targeting unit and the alt-speed targeting unit set a size of the target space based on the information of the travel speed of the own vehicle.

3. The collision avoidance support apparatus of claim 1 further comprising:

a relative speed acquisition unit for acquiring a relative speed of the other vehicle in the adjacent lane relative to the own vehicle; and a correction unit for correcting a size of the target space based on the relative speed.

4. The collision avoidance support apparatus of claim 3, wherein the correction unit corrects the size of the target space by adjusting a boundary of the target space on an other vehicle side with reference to a standard position that is positioned right beside the own vehicle in the adjacent lane, and the adjusted boundary position of the target space on the other vehicle side is determined according to the relative speed.

5. The collision avoidance support apparatus of claim 1 further comprising:

a notification unit for notifying a driver of the own vehicle of a determination result of the lane change determination unit.

6. The collision avoidance support apparatus of claim 5 further comprising:

an operation result acquisition unit for acquiring an operation result of a lane change operation by the driver of the own vehicle; and a prohibition unit for prohibiting an operation of the notification unit when the lane change operation is not detected by the operation result acquisition unit.

7. The collision avoidance support apparatus of claim 1 further comprising:

a speed adjustment unit for automatically performing a speed adjustment until the speed of the own vehicle becomes suitable for lane change in case that the lane change determination unit has determined that the lane change is safe by acceleration or deceleration of the own vehicle.

8. The collision avoidance support apparatus of claim 7 further comprising:

an operation result acquisition unit for acquiring an operation result of a lane change operation by the driver of the own vehicle; and a prohibition unit for prohibiting an operation of the speed adjustment unit when the lane change operation is not detected.

9. The collision avoidance support apparatus of claim 1 wherein, the lane change determination unit determines to perform the lane change after the other vehicle passes by, even when at least one of the diagonally-side areas set by the alt-speed targeting unit is free of the other vehicle, when the other vehicle exists in the right-beside area set by the constant speed targeting unit and the relative speed of approach of the other vehicle in the right-beside area is equal to or greater than the threshold speed.

10. A collision avoidance support apparatus of claim 1 further comprising:

an alert unit notifying a user of whether the lane change is to be performed.

11. A collision avoidance support apparatus of claim 1; wherein the lane change determination unit maintains the current speed by not accelerating or decelerating the own vehicle.

12. A program product having instructions stored in a non-transitory computer-readable storage medium, the instructions comprising:

controlling a computer to be serving as respective units that constitute a collision avoidance support apparatus for providing lane change support for an own vehicle when the own vehicle moves from a currently-traveling lane to an adjacent lane, the apparatus comprising:

a constant-speed targeting unit for setting as a constant-speed target space a right-beside area of the own vehicle in the adjacent lane for a constant-speed lane change of the own vehicle at a current speed;

an alt-speed targeting unit for setting as (i) an accelerated-speed target space a forward diagonally-side area of the own vehicle in the adjacent lane for an accelerated-speed lane change of the own vehicle, wherein the forward diagonally-side area includes a forward extension of the right-beside area when the own vehicle is required to accelerate before moving to the target space in the adjacent lane, and as (ii) a decelerated-speed target space a backward diagonally-side area of own vehicle in the adjacent lane, wherein the backward diagonally-side area includes a backward extension of the right-beside area when the own vehicle is required to decelerate before moving to the target space in the adjacent lane;

a vehicle detection unit for detecting a position of an other vehicle that is traveling in the adjacent lane;

a target extraction unit for extracting, from among target spaces set by each of the targeting units, a target space that is free of the other vehicle based on the detected position of the other vehicle from the vehicle detection unit;

a lane change determination unit for determining whether to perform a lane change, wherein the determination of whether to perform the lane change is one of (a) the lane change of the own vehicle is unsafe when each of the right-beside area and the diagonally-side areas in the adjacent lane is occupied by at least one other vehicle, (b) the lane change of the own vehicle to the right-beside area is safe at the current speed when the right-beside area in the adjacent lane is not occupied by the other vehicle, and (c) the lane change of the own vehicle to the diagonally-side area is safe after acceleration or deceleration when the diagonally-side area with the forward extension or with the backward extension in the adjacent lane is not occupied by the other vehicle; and a relative speed acquisition unit for acquiring a relative speed of the other vehicle in the adjacent lane relative to the own vehicle, wherein, the lane change determination unit performs the constant-speed lane change of the own vehicle when the other vehicle is not in the constant-speed target space, the lane change determination unit maintains the own vehicle at a current speed such that the constant-speed lane change of the own vehicle is performed after the other vehicle passes the own vehicle when the other vehicle is in the constant-speed target space and the relative speed of approach of the other vehicle is equal to or greater than a threshold speed, the lane change determination unit performs the decelerated-speed lane change of the own vehicle when the other vehicle is in the constant-speed target space, the relative speed of approach of the other vehicle is less than the threshold speed, and the other vehicle is not in the decelerated-speed target space, or the lane change determination unit performs the accelerated-speed lane change of the own vehicle when the other vehicle is in the constant-speed target space, the relative speed of approach of the other vehicle is less than the threshold speed, the other vehicle is in the decelerated-speed target space, and the other vehicle is not in the accelerated-speed target space.

13. A method of avoiding collision of an own vehicle that is moving from a currently-traveling lane to an adjacent lane in traffic, the method comprising:

detecting a position of an other vehicle in the adjacent lane;

detecting a travel speed of the own vehicle;

calculating a relative speed of the other vehicle;

defining a lane change target space in the adjacent lane, the target space defined as at least one of:

(i) a constant-speed target space at a right-beside area of the own vehicle in the adjacent lane for a constant-speed lane change of the own vehicle at a current speed, (ii) an accelerated-speed target space at a forward diagonally-side area of the own vehicle in the adjacent lane for an accelerated-speed lane change of the own vehicle, wherein the forward diagonally-side area includes a forward extension of the right-beside area when the own vehicle is required to accelerate before moving to the target space in the adjacent lane, and (iii) a decelerated-speed target space at a backward diagonally-side area of the own vehicle in the adjacent lane for an decelerated-speed lane change of the own vehicle, wherein the backward diagonally-side area includes a backward extension of the right-beside area when the own vehicle is required to decelerate before moving to the target space in the adjacent lane;

determining lane-changeability based on the defined lane change target space and the detected position of the other vehicle;

providing a lane change instruction that instructs either (a) to move to the adjacent lane when the determined lane-changeability is positive, or (b) to maintain the own vehicle at a current speed in the currently-traveling lane when the determined lane-changeability is not positive;

providing a restricted lane change instruction when at least one of the accelerated target space and the decelerated target space is free of the vehicle, wherein the restricted lane change instruction to maintain the own vehicle at a current speed in the currently-traveling lane until the other vehicle passes is provided when the relative speed of approach of the other is equal to or greater than a predetermined threshold;

performing the constant-speed lane change of the own vehicle when the other vehicle is not in the constant-speed target space, maintaining the own vehicle at a current speed such that the constant-speed lane change of the own vehicle is performed after the other vehicle passes the own vehicle when the other vehicle is in the constant-speed target space and the relative speed of approach of the other vehicle is equal to or greater than a threshold speed, performing the decelerated-speed lane change of the own vehicle when the other vehicle is in the constant-speed target space, the relative speed of approach of the other vehicle is less than the threshold speed, and the other vehicle is not in the decelerated-speed target space, or performing the accelerated-speed lane change of the own vehicle when the other vehicle is in the constant-speed target space, the relative speed of approach of the other vehicle is less than the threshold speed, the other vehicle is in the decelerated-speed target space, and the other vehicle is not in the accelerated-speed target space.

14. The method of claim 13, wherein a lane change instruction to move to the adjacent lane is provided when there is no vehicle in the target space of the side position.

15. The method of claim 13, wherein the restricted lane change instruction to move to the adjacent lane is conditionally provided when the relative speed of the other vehicle in the target space of the side position is smaller than a predetermined threshold.

16. The method of claim 15, wherein the restricted lane change instruction to move to the adjacent lane after deceleration is provided when there is no vehicle in the decelerated target space.

17. The method of claim 15, wherein the restricted lane change instruction to move to the adjacent lane after acceleration is provided when (a) there is at least one other vehicle in the decelerated target space, and (b) there is no other vehicle in accelerated target space.

18. The method of claim 13, wherein the lane change instruction is provided when an operation of a lane-change associated device by a driver of the own vehicle is detected.

19. The method of claim 18, wherein the lane-change associated device is a blinker of the own vehicle.

20. The method of claim 18, wherein at least one of an engine and a brake of the own vehicle is controlled to adjust the travel speed of the own vehicle based on the determination of lane-changeability.

* * * * *